United States Patent
Hewelt

(10) Patent No.: US 10,673,277 B2
(45) Date of Patent: Jun. 2, 2020

(54) SYSTEMS AND METHOD FOR HIGH POWER CONSTELLATIONS FOR WIRELESS CHARGING AND POWER DELIVERY

(71) Applicant: Flag Acquisition, LLC, Lake Forest, IL (US)

(72) Inventor: Scott Hewelt, China, MI (US)

(73) Assignee: FLI Charge, LLC, Lake Forest, CA (US)

( * ) Notice: Subject to any disclaimer, the term of this patent is extended or adjusted under 35 U.S.C. 154(b) by 0 days.

(21) Appl. No.: 16/395,092

(22) Filed: Apr. 25, 2019

(65) Prior Publication Data

US 2019/0252917 A1    Aug. 15, 2019

Related U.S. Application Data

(63) Continuation of application No. 15/147,732, filed on May 5, 2016, now Pat. No. 10,284,012.

(60) Provisional application No. 62/157,726, filed on May 6, 2015.

(51) Int. Cl.
  *H02J 50/10* (2016.01)
  *H02J 7/02* (2016.01)
  *H02J 50/60* (2016.01)

(52) U.S. Cl.
  CPC .............. *H02J 50/10* (2016.02); *H02J 7/025* (2013.01); *H02J 50/60* (2016.02)

(58) Field of Classification Search
  CPC ............. H02J 50/10; H02J 50/60; H02J 7/025
  USPC ................................. 307/104, 107, 109–115
  See application file for complete search history.

(56) References Cited

U.S. PATENT DOCUMENTS

| | | | |
|---|---|---|---|
| 1,668,249 A | 5/1928 | Rich |
| 1,779,052 A | 10/1930 | Souplis |
| 2,717,557 A | 9/1955 | Seyffer |
| 3,205,618 A | 9/1965 | Heytow |
| 3,885,502 A | 5/1975 | Sarno et al. |
| 4,324,301 A | 4/1982 | Eyerly |
| 5,733,674 A | 3/1998 | Law et al. |
| 5,868,076 A | 2/1999 | Myus et al. |
| 6,027,028 A | 2/2000 | Pieterse et al. |
| 7,101,232 B2 | 9/2006 | Shimizu |
| 7,172,196 B2 | 2/2007 | Randall |
| 7,399,202 B2 | 7/2008 | Dayan et al. |

(Continued)

FOREIGN PATENT DOCUMENTS

WO    WO-2009082181 A2    7/2009

OTHER PUBLICATIONS

Non-Final Office Action dated Nov. 8, 2017, by the U.S. Patent and Trademark Office relating to U.S. Appl. No. 15/147,732.

(Continued)

*Primary Examiner* — Tomi Skibinski
(74) *Attorney, Agent, or Firm* — Honigman LLP

(57) ABSTRACT

A system for high powered wireless power delivery and charging includes an electronic device having a wireless charging module. The wireless charging module includes a power management module, the power management module configured and executing instructions to enable and disable the power delivery or charging of the electronic device based on whether a valid charging circuit exists, the power management module additionally configured and executing instructions to prevent a detection of an invalid load.

20 Claims, 4 Drawing Sheets

(56) References Cited

U.S. PATENT DOCUMENTS

| | | | |
|---|---|---|---|
| 7,405,535 B2 | 7/2008 | Frerking et al. | |
| 7,932,638 B2 | 4/2011 | Randall | |
| 7,982,436 B2 | 7/2011 | Randall | |
| 7,986,059 B2 | 7/2011 | Randall | |
| 8,081,408 B2 | 12/2011 | Randall | |
| 8,836,292 B1 * | 9/2014 | Klughart | H02P 9/14 322/24 |
| 9,065,157 B2 | 6/2015 | Van Wiemeersch et al. | |
| 2004/0048511 A1 | 3/2004 | Dayan et al. | |
| 2004/0082369 A1 | 4/2004 | Dayan et al. | |
| 2006/0085105 A1 | 4/2006 | Chiu et al. | |
| 2006/0268489 A1 | 11/2006 | Sung | |
| 2007/0090789 A1 | 4/2007 | Chang et al. | |
| 2008/0227336 A1 | 9/2008 | Kleber | |
| 2009/0179501 A1 * | 7/2009 | Randall | H01R 25/147 307/104 |
| 2009/0190276 A1 * | 7/2009 | Randall | H02H 7/1252 361/56 |
| 2010/0026246 A1 | 2/2010 | Yamaguchi et al. | |
| 2011/0148041 A1 | 6/2011 | Randall | |
| 2011/0210617 A1 | 9/2011 | Randall | |
| 2012/0080958 A1 * | 4/2012 | Randall | G06F 1/1616 307/326 |
| 2013/0258170 A1 | 10/2013 | Tamaki | |
| 2014/0035523 A1 | 2/2014 | Winget et al. | |

OTHER PUBLICATIONS

Final Office Action dated Jun. 15, 2018, by the U.S. Patent and Trademark Office relating to U.S. Appl. No. 15/147,732.

* cited by examiner

Figure 1: Forward Current versus Forward Voltage

DATE 1/30/2015
DESIGN /-AMP (140W) HIGH-POWER RECTIFIER CONSTELLATION & SOFT-START CIRCUIT
ENG: S. HEWELT

| QTY- | DESCRIPTION | VALUE | MANUFACTURE | MANUFACTURE PART # | •PKG | VENDOR | VENDOR PART 3 | $/EA | TOTAL |
|---|---|---|---|---|---|---|---|---|---|
| 4 | MOSFET N/P-CH 30V 8A/7A 8-SOIC | N-CH&P-CH | ALPHA & OMEGA | AO4616 | SOIC-8 | DIGIKEY | 785-1043-1-ND | $0.32 | $1.28 |
| 3 | TRANS NPN 40V 0.2A SOT23 | NPN | FAIRCHILD | MMBT390.1 | SOT23 | DIGIKEY | MMBT3904FSTR-ND | $0.03 | $0.24 |
| 8 | TRANS PNP10V 0.2 A SOT-23 | PNP | FAIRCHILD | MMBT35Q6 | SOT23 | DIGIKEY | MMBT3904FSTR-ND | $0.03 | $0.24 |
| 8 | DIODE SCHOTTKY 30V 20QMA SOT23-3 | SCHOTTKY 30V @ 200mA | FAIRCHILD | BAT54 | SOT23-3 | DIGIKEY | BAT54FSTR-ND | $0.02 | $0.16 |
| 1 | DIODE SCHOTTKY 30V 5A SMC | SCHOTTKY 30V @ 5A | VISHAY | SSCS31-E3/57T | D0214AB | DIGIKEY | SSC531-E3/57TG1CT-ND | $0.30 | $0.30 |
| 1 | DIODE SCHOTTKY 40V 1A | 40v @ 1A | TOSHIBA / DIODES INC | 1N5B19 | | | CRS10140B/IN5819HW-7-F | $0.01 | $0.01 |
| 1 | MOSFET N-CH 60V 11SMA | 60V@ 115mA | ON SEMICONDUCTOR | 2N7001 | | | 2N7002LT1G | $0.03 | $0.03 |
| 1 | MOSFET P-CH 30V 15A | 30V @ 15A | ALPHA / OMEGA | ACXW09 | | P03724 | AO4409 | $0.20 | $0.20 |
| Optional | MOSFET P-CH 30V 8A | 30V @ 8A | ALPHA/OMEGA | AO4411 | | | AO4411 | $0.11 | $0.00 |
| 1 | RES SMD 2.7K OHM 1% 1/10W | 2.7K | ANY | ANY | 0603 | ANY | ANY | $0.01 | $0.01 |
| 4 | RES SMD 10K OHM 1% 1/10W | 10 K | ANY | ANY | 0603 | ANY | ANY | $0.01 | $0.04 |
| 9 | RES SMD 26.1K OHM 1% 1/10W | 26.1K | ANY | ANY | 0603 | ANY | ANY | $0.01 | $0.09 |
| 14 | RES SMD 49.9K OHM 1% 1/10W | 49.9K | ANY | ANY | 0603 | ANY | N04001-000 | $0.01 | $0.14 |
| 15 | RES SMD 100K OHM 1% 1/10W | 100K | ANY | ANY | 0603 | ANY | ANY | $0.01 | $0.15 |
| 16 | RES SMD 301K OHM 1% 1/10W | 301K | ANY | ANY | 0603 | ANY | ANY | $0.01 | $0.16 |
| 4 | CAP CER 27PF 50 V 5% NPO | 27pf | ANY | ANY | 0603 | ANY | ANY | $0.01 | $0.04 |
| 9 | CAP CER 0.1µF 35V 10% X5R | .1 µF | ANY | ANY | 0603 | ANY | P02753 | $0.02 | $0.18 |
| 1 | CAP CER 0.47 µF 35V 10% X5R | .47 µF | ANY | ANY | 0603 | ANY | ANY | $0.03 | $0.03 |
| 1 | CAP CER 1 µF 35V 10% X5R | 1 µF | ANY | ANY | 0603 | ANY | ANY | $0.04 | $0.04 |
| | | | | | | | | | $3.34 |

Fig. 3

SYSTEMS AND METHOD FOR HIGH POWER CONSTELLATIONS FOR WIRELESS CHARGING AND POWER DELIVERY

CROSS REFERENCE TO RELATED APPLICATIONS

This U.S. patent application is a continuation of, and claims priority under 35 U.S.C. § 120 from, U.S. patent application Ser. No. 15/147,732, filed on May 5, 2016, which claims priority under 35 U.S.C. § 119(e) to U.S. Provisional Application 62/157,726, filed on May 5, 2015. The disclosures of these prior applications are considered part of the disclosure of this application and are hereby incorporated by reference in their entireties.

BACKGROUND

Field of the Invention

Wireless charging is desirable for electronic device users. Typically, users carry electronic devices with them during the day, such as tablets, smart phones, and similar items. Such devices have small ports for connecting a charger. In many scenarios, users find the connection of a charger cumbersome and, additionally, may forget to connect the charger. In many scenarios, such as a coffee shop or other location that consumers or people frequent, it may be desirable to have a single pad that may charge multiple devices. Current systems may not have enough power to charge multiple devices on a single pad at a standard speed and rate that is comparable to charging a single device on the pad. Additionally, users may desire to power devices drawing high power such as small appliances in RV markets, laptops, power-tool & garden tool batteries, etc.

SUMMARY

In one embodiment, a system for high powered power delivery includes an electronic device having a wireless power delivery module. The wireless power delivery module includes a power management module, the power management module configured and executing instructions to enable and disable power delivery to the electronic device based on whether a valid constellation circuit exists, the power management module additionally configured and executing instructions to prevent a detection of an invalid load. Optionally, the electronic device includes a plurality of contacts, the plurality of contacts creating a circuit for the power delivery when placed on a conductive power pad. Alternatively, the wireless power delivery module and the plurality of contacts are part of a case on the electronic device, and the wireless charging module is also in the case. In one alternative, the wireless power delivery module includes a constellation that is configured to detect that the valid constellation circuit exists, the constellation in communication with the power management module. The constellation may include a power input circuit containing array of contacts, capacitors, diodes (configured as a rectifiers) and load resistor. In another alternative, the wireless power delivery module further includes a bypass-rectifier, the bypass-rectifier in communication with the power management module and configured to charge the electronic device when the valid constellation circuit exists. Optionally, the power management module is configured and executing instructions to periodically turn on the constellation to detect the valid constellation circuit. Alternatively, wherein the power management module turns on the bypass-rectifier when the valid constellation circuit is detected and the constellation is on. Optionally, the wireless power delivery module includes a soft-start module, the soft-start module providing a delay for a ramping up of charging voltage for the bypass-rectifier when the valid constellation circuit is first detected. In one configuration, the power delivery includes charging a battery of the electronic device.

In one embodiment, a case for high powered powering of an electronic device includes a case body and a plurality of contacts on the case body for creating a circuit for charging when placed on a conductive power pad. The case further includes a wireless power delivery module. The wireless power delivery module includes a power management module, the power management module configured and executing instructions to enable and disable the charging of the electronic device based on whether a valid constellation circuit exists, the power management module additionally configured and executing instructions to prevent a detection of an invalid load. The wireless power delivery module includes a constellation that is configured to detect that the valid charging circuit exists, and the constellation is in communication with the power management module. Optionally, the wireless power delivery module further includes a bypass-rectifier, the bypass-rectifier in communication with the power management module and configured to provide power to the electronic device when a valid constellation circuit exists. Alternatively, the power management module is configured and executing instructions to periodically turn on the constellation to detect the valid constellation circuit. Optionally, the power management module turns on the bypass-rectifier when the valid constellation circuit is detected and the constellation is on. Alternatively, the wireless power delivery module includes a soft-start module, the soft-start module providing a delay for a ramping up of charging voltage for the bypass-rectifier when the valid constellation circuit is first detected. In one configuration, the power delivery includes charging a battery of the electronic device.

In one embodiment, a method of high powered wireless charging includes providing an electronic device having a wireless power delivery module, the wireless charging module including a power management module. The method further includes executing instructions in the power management module to determine whether to charge the electronic device; and enabling power delivery to the electronic device based on whether a valid constellation circuit exists. Optionally, the electronic device includes a plurality of contacts, and the method further comprises creating a circuit with the plurality of contacts when the electronic device is placed on a conductive power pad. In one configuration, the method further includes detecting that the valid constellation circuit exists with a constellation included as part of the wireless charging module, the constellation in communication with the power management module. In one alternative, the method includes providing power to the electronic device through a bypass-rectifier when a valid constellation circuit exists, the bypass-rectifier in communication with the power management module. In another alternative, the method includes periodically turning on the constellation to detect the valid constellation circuit. Alternatively, the method includes turning on the bypass-rectifier when the valid constellation circuit is detected and the constellation is on. Alternatively, the method includes delaying a ramping up of charging voltage for the bypass-rectifier with a soft-start module, when the valid constellation circuit is first detected.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 3 shows a chart of components used for the system of FIG. 2;

DETAILED DESCRIPTION

Figure 1:
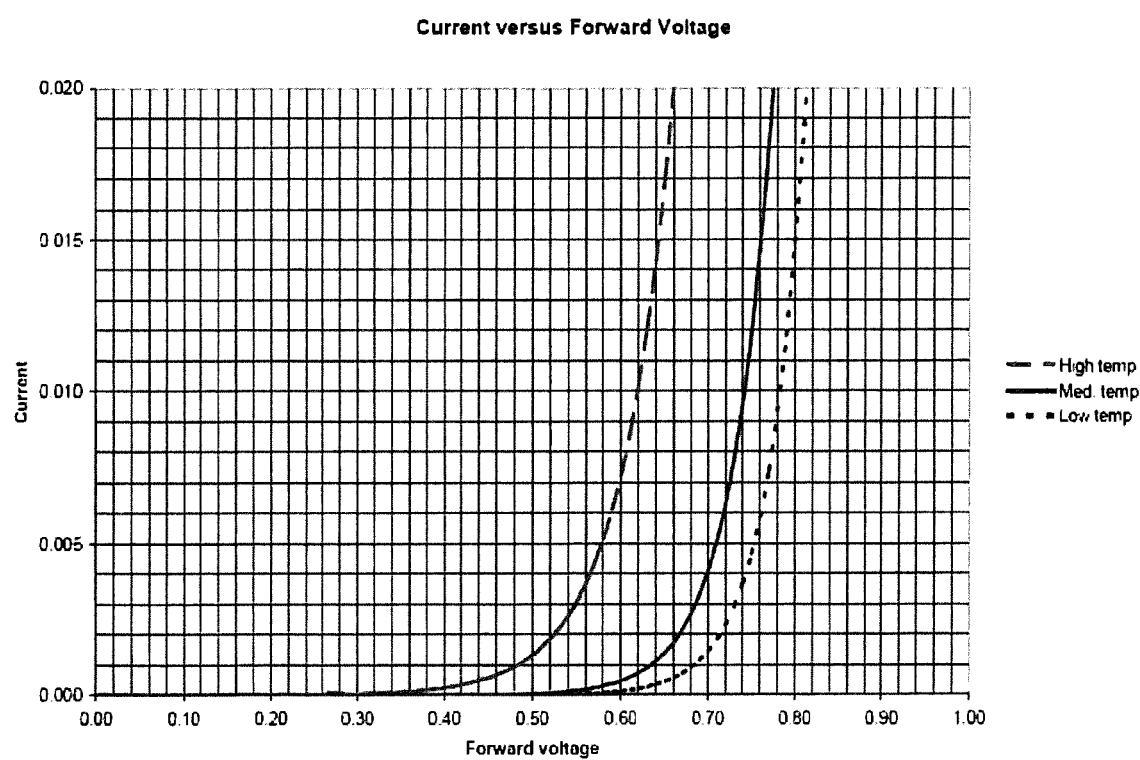
FIG. 1 shows a graph depicting a typical diode forward voltage (Vf) temperature profile.

Certain terminology is used herein for convenience only and is not to be taken as a limitation on the embodiments of the systems and methods for high powered constellations for conductive charging and power delivery pads. In the drawings, the same reference letters are employed for designating the same elements throughout the several figures.

Conductive charging technology for electronic devices such as smart phones, tablets, and other devices is quickly becoming a popular charging technology. Higher powered devices are becoming more common as well as the desire for convenient power delivery and charging. This is due, at least in part, to the high efficiency, speed of charging, and reduced interference with other systems as compared to inductive technology. In many configurations, a device having a specially configured back or a case that includes a plurality of contacts is placed on a charging pad having a plurality of contact pads. A circuit for providing power I charging is established by rectifying the current from the pad through the contacts of the device and establishing a direction of current flow. In some configurations, the plurality of contacts may be oriented such that, no matter how the device is placed on the pad, a charging circuit may be established.

Conductive charging technology as described herein, relates to the transfer of power from a pad to an electronic device. The descriptions of systems and configurations described herein relate to both systems used for the powering and charging of electronic devices and are merely exemplary configurations. For instance, a variety of different devices having charging contacts may be placed on a charging pad and run directly from the power transferred.

Alternatively, a battery in the electronic devices may be charged. For example, a mixer having enabling contacts might be placed on a pad and powered directly. A phone having a case, might be placed on the same pad and have its battery charged. Although in this application at times either charging or power transfer is described, the systems and methods may be used for any such system.

One issue faced by conductive charging pads is the inherent capability to deliver higher power and higher currents to the load. The increased current delivery causes a decrease the forward voltage (Vf) of the input "constellation" rectifying diodes. The pad typically includes software that determines if a valid load has been placed on the pad. The pad software typically performs this determination by analysis of the diode Vf. Since the Vf will decrease under heat and increased amperage, the system no longer detects the load as being a valid one. In some embodiments, the solution to this issue is to separate the detection circuit from the circuit that provides power to the device through the conductive charging. In many configurations, this may be done via a bypass-rectifier. Essentially, the circuitry is configured such that, once the voltage is above a certain threshold, the part of the system that checks for sufficient voltage is bypassed and is only activated again on a periodic cycle. The cycle time is ordinarily short; however, this bypass prevents the constant provision of power by providing a system that checks for sufficient voltage from being under constant current, which prevents heating and prevents effects on the measurement of Vf. In another embodiment, the system may be configured to adjust the Vf needed for the system to determine that a chargeable device is connected. In this case, the Vf needed will be adjusted down as the system heats up. Generally, the systems are referred to as being part of a wireless charging module. This module includes a power management module (PMM) that includes code for executing the power management functions. The power management module generally communicates with a constellation that assists in detecting valid loads and drives power through a bypass-rectifier when not checking for valid loads. Additionally, a soft-start module may be included in the wireless charging module to provide for more gradual current increase at the start of current delivery. The PMM may be hardware, software, or a combination of both. The features described herein may be implemented as hardware, software, or a combination of both. All or part of the PMM may be part of the wireless charging module or may be a separate module.

In many embodiments of a conductive charging system without a high powered constellation, the Vf value of the constellation diode is affected by the current. For example, when load current exceeds values as low as 2 amps (I>2 A) the constellation diode Vf value decreases. The Vf (diode PN junction) typically decreases proportionally with an increase in temperature. As a result, when Vf decreases, the power management module software discrimination no longer recognizes the constellation as a valid load, since the threshold has decreased below the PMM threshold value in the software. Various diodes have been tested with increased Vf; however, as they all heat up with current, eventually the Vf decreases below threshold because of this increase in heat. PMM also has a tracking algorithm that will reject major changes in Vf. PMM will not recognize the "constellation" as a valid load until after time has passed and diodes have cooled off enough to fall back within the PMM tracking range (this can be minutes). Therefore, this is not a viable high powered solution.

All high current "constellations" will have this PMM issue since all diodes respond with Vf decreasing with temperature increase. Therefore, in many embodiments, a system is provided that allows the Vf to remain stable despite the current flowing through the system to perform the charging operations.

In one embodiment, the PMM signal driving the charging pad may be a multiplexed analog I digital signal. There is a brief period, for example, every 2.5 milliseconds (mS) where the PMM removes drive current to check for a valid constellation I load. The PMM then decides whether to continue supplying power to the charging pad or turn the power off. This process for decision checks thresholds for over-current (load too large or foreign object, short, etc.), under-current (no-load or load <10 mA), and valid constellation verification, including upper/lower thresholds associated to the diodes' forward voltage (Vf).

In some embodiments, the PMM requires a valid constellation to be present before it will activate the charging pad drive cycle. Schottky diodes in the constellation have Vf matched to internal software thresholds and are used to rectify or "steer" the current to the load. Pure resistive or linear loading will not allow PMM to activate due to absence of matching the upper and lower constellation diode Vf thresholds in software provided with the system.

Diodes are silicon devices, and Vf responds linearly and predictably to ambient temperature changes. Equation 1 below shows this theoretical response. FIG. 1 shows a graph depicting a typical diode Vf temperature profile. Note the negative shift in Vf as temperature increases.

$$T_j = mV_f + T_o \quad \text{(Equation 1)}$$

where
$T_j$=junction temperature in ° C.
m=slope* in ° C./Volt
$V_f$=forward voltage drop
$T_o$=intercept* in ° C.
Device specific parameters As the constellation current increases (for example above approximately 2 amps) there is enough diode self-heating during rectification to cause a negative shift in (Vf). Once the Vf decreases due to self-heating, it no longer matches the PMM threshold requirements. If the constellation is removed after self-heating has caused the shift in Vf, then replaced, the PMM will no longer recognize the constellation as valid until enough time has passed to allow the diode cooling for Vf to increase in value.

A useful solution is to minimize or eliminate the self-heating within the diodes so that PMM always observes the ideal Vf to match the internal thresholds for the activation of rectification and providing power.

In some alternative embodiments, the system monitors diode temperature and then, through communication with the PMM, adjusts the software threshold to match the predictable Vf value. This system includes some level of complication with communication between the PMM and the constellation, in component count, software, and physical size. Also, this does not solve the issue when a "hot" device is on the charging pad while a second "cold" device is also placed on the charging pad (multiple units placed on the charging pad at different times).

Another disadvantage is that, with higher currents, the diode Vf reduces to very low voltage value. It is possible that the PMM will no longer distinguish the difference between a "hot" constellation diode Vf and a resistive load, allowing the PMM to continue powering the charging pad during unsafe conditions (shorts, keys, coins, etc.).

Another embodiment uses physically large diodes with increased surface area and additional copper area to dissipate heating. This arrangement attempts to maintain Vf through thermal management. A drawback to this configuration is that it would require large areas for cooling and would still have limitations as current increased, since it may not be possible to actively cool the area enough to maintain lower Vf during self-heating.

In one embodiment, a constellation having diodes that maintain a consistent Vf under all charging conditions, temperatures, and load currents is provided. Instead of the diodes being constantly active, the PMM reacts to the constellation as a "key" to enable the power drive circuitry. Without a valid constellation, the drive circuit is not enabled.

Figure 2:
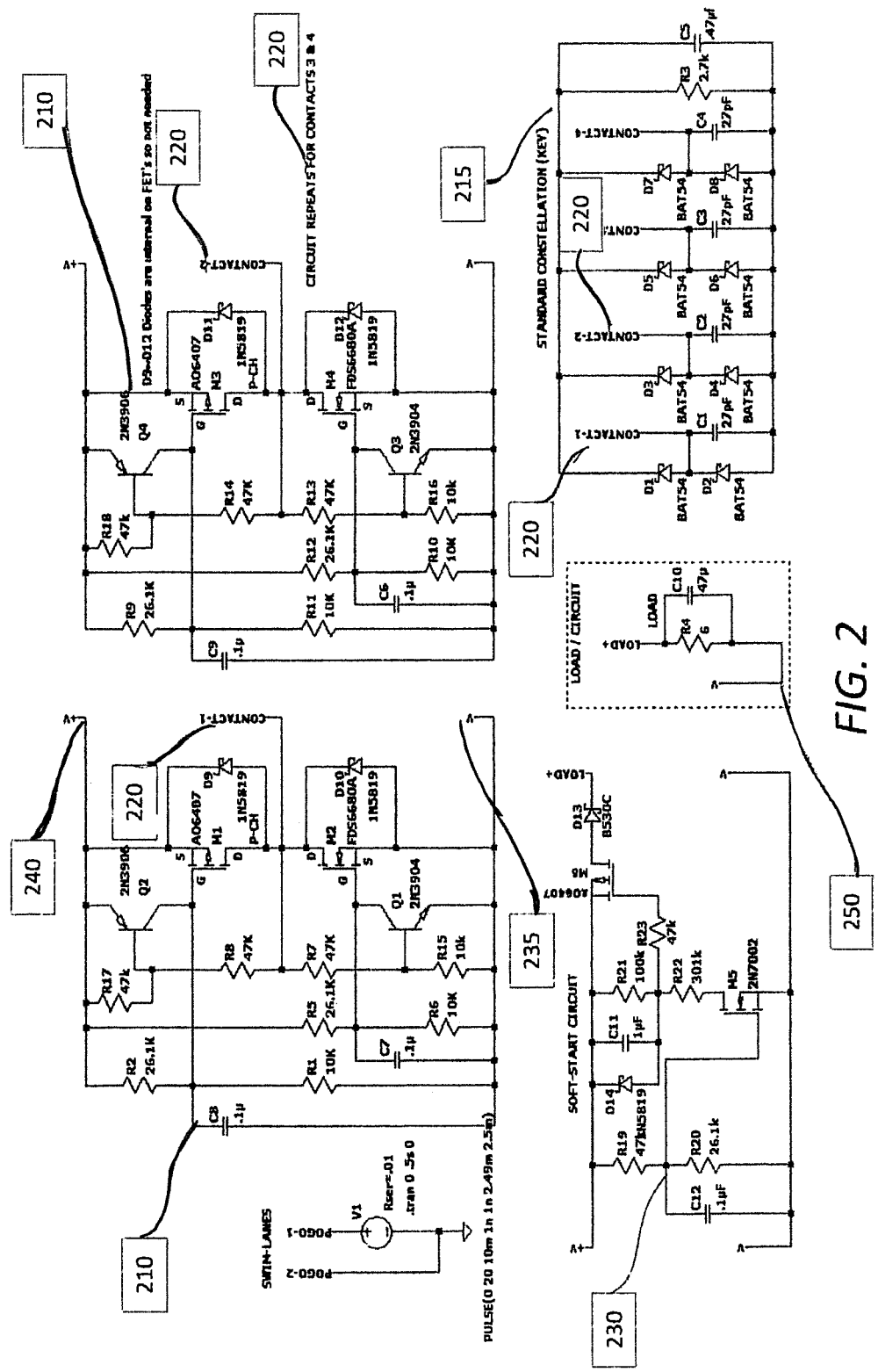
FIG. 2 shows one embodiment of a system for high power constellations for wireless charging.

The diodes in the constellation are used as the "key" to enable the charging pad, but they do not actually pass load current (related to the charging of the device) through the diodes, thus maintaining the Vf value. The system is configured to bypass the constellation diodes except to periodically check that charging should occur by checking the Vf value. This is possible because of a technique used by the PMM drive circuit software. One such embodiment is shown in FIG. 2.

According to one embodiment, once the PMM confirms a valid constellation is in place, it enables the "drive" circuit to deliver power to the load, and then periodically checks to confirm the constellation is still valid. Once the constellation "key" triggers the enable process, it serves no purpose other than steering current from the charging pad to the load for the next cycle. This process is repeated, while providing power, and monitoring the charging pad for a valid constellation, checking for voltage thresholds, short circuits, over-current, etc.

This embodiment bypasses the constellation and has an activation voltage above the typical constellation "Vf" software threshold monitored by the PMM. When the PMM checks for a valid constellation, the bypass rectifier circuit is transparent. The PMM enables the "drive" circuit and, as voltage increases toward Vcc power (for example, 20V), the bypass circuit is activated somewhere above the "Vf" value (for example, 4V) and remains activated for the complete power cycle. When the PMM charging pad voltage starts to decrease, this de-activates the drive circuit when the bypass-rectifier loses bias above the "Vf" value. When the PMM checks again for the constellation thresholds, everything appears normal with typical Vf thresholds (rectifier is again transparent) and the cycle is repeated.

The high load currents are directed through the bypass rectifier, completely avoiding the constellation diodes. The constellation has a minimal bias resistor (for example, R3—2.7K), only enough to be validated by the PMM. Essentially, no load current flows through the constellation diodes; therefore, the diodes remain cool and Vf remains very stable regardless of load currents.

The bypass rectifier circuit 210 is used for every constellation contact 220; therefore, (4) are needed for a typical constellation 215 containing 4 contacts. Current limitation is based upon amperage of the P-CH and N-CH MosFETs selected. In what is merely an example of one configuration, using an A04616 N-CH I P-CH complementary package, self-heating is minimal with RDS in the 20-milliohm range. Typical wattage at 7 amps would be 7 A^2×0.020-ohms=0.98 W per channel (only one MosFET is conducting per contact; therefore, this is a worst-case package wattage). Assume FR4 w/2 oz copper for PCB material. FIG. 3 shows a chart of components used for the system of FIG. 2. Note that in FIG. 2, capacitors CS (1st stage) and C9 (2nd stage) are listed as 0.1 uF. In many configurations, these values will be reduced significantly in order to ensure proper function.

Figure 4A:
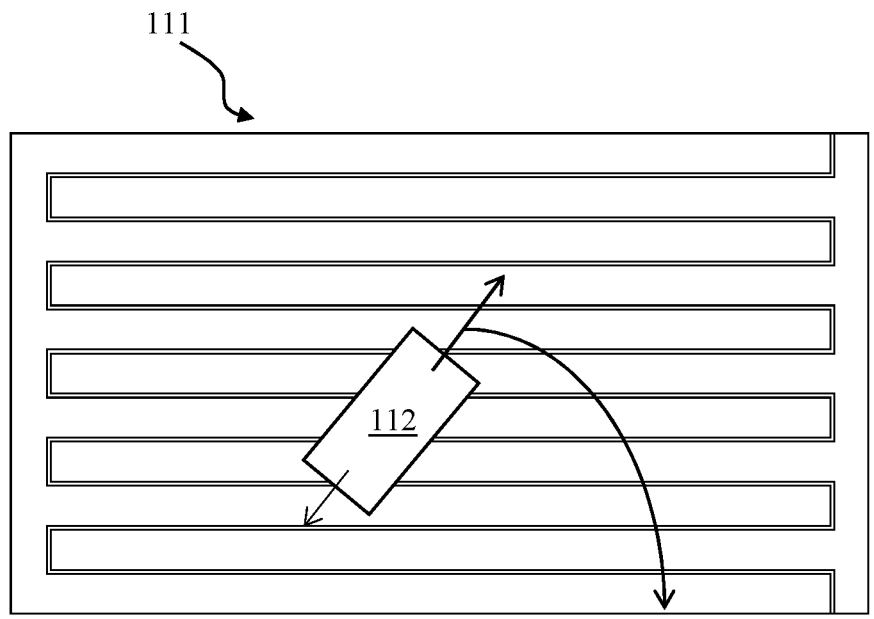
FIGS. 4a-4c show one embodiment of a charging pad and electronic device for use with the system of FIG. 2.
Figure 4B:
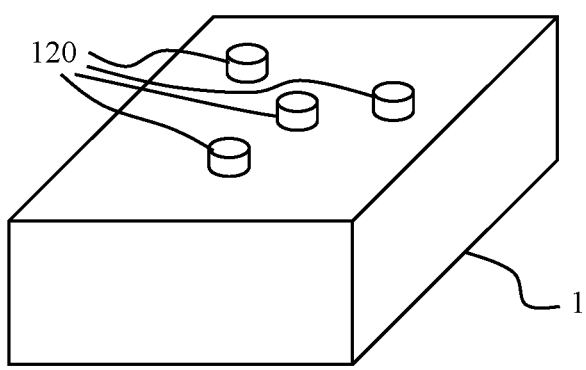
Figure 4C:
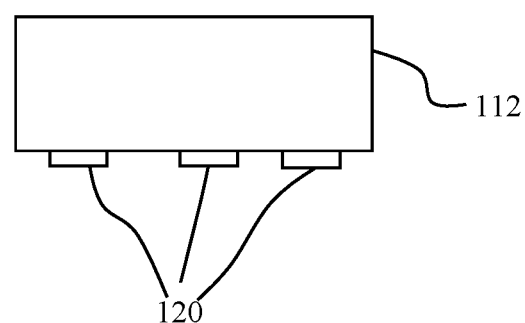

FIGS. 4a-4c show a charging pad 111 and electronic device 112 on the pad. Electronic device 112, in many embodiments, is a smart phone having a case. Electronic device 112 includes a contact interface (constellation contacts) for interface with charging pad 111.

Contacts 120 are the contact(s) interface to charging pad 111. Power is transferred to the constellation I rectifier circuit through the contacts from the pad surface.

The proposed high-power bypass rectifier input (common drain connections) are each connected to contacts 120 of the standard constellation.

In some embodiments, a soft-start circuit 230 is placed after the bypass-rectifiers 210 and is connected to the bypass-rectifier +V and −V nodes 240, 235. The soft-start circuit 230 reduces the instantaneous surge currents by ramping up the voltage to the load through the load circuit 250. This minimizes over-current and high-current transients that cause sparks and arcs at the pad contacts. Delay is calculated for delayed (in some examples this may be 25 mS) ramp up, which reduces the current transients significantly to the pad, but also is quick to respond.

The need for the soft-start exists when the pad is already active with an existing load. Without a soft-start, the live pad may cause sparks and arcs at the contacts from the instantaneous current draw. The soft-start provides a short delay, where the contacts are high-impedance when the constellation is initially placed on the pad. Once in place, a short delay occurs as the voltage is ramped up for a controlled current delivery to the load, reducing transients and high-current surges.

As shown in FIG. 2, constellation 215 includes standard Schottky diodes configured as a rectifier circuit. Bypass capacitors (static protection) and filter capacitors are included as per the original already patented design. The constellation 215 includes bias resistor (which in some examples is approximately 2.7K) to provide minimal pre-load to meet pad requirements to be recognized as a valid load.

As shown in FIG. 2, soft-start circuit 230 includes initial resistor dividers R19 and R20 and filter capacitor C12 which determine a bias threshold to turn on M5 MosFET. When M5 turns on, R22 and C11 determine the RC time delay for enabling M6 to fully turn on. M6 gate voltage tracks the bias voltage on R21 and R22, while delay from C11 provides a controlled ramp up for a slow turn-on for current flow between Source to Drain of M6 (Gate controls internal resistance between Source and Drain on MosFET, thus controlled enable). R21 and 014 are paths for C11 quick discharge when M5 turns off or pad power is removed. 013 diode functions to eliminate any reverse current from load I capacitance charge feeding back to the rectifier MosFETs during turn-on bias. The diode will carry full load currents, so it must be selected for maximum load amperage. A Schottky diode is used in many embodiments to reduce Vf drop, power loss, and heating.

As shown in FIG. 2, a bypass-rectifier 210 may be deployed at each contact, such that there are four in all for the constellation 215 shown. The bypass-rectifier includes both a P-CH and N-CH MosFET in a rectifier configuration. A common drain connected as input receives power from the pad contacts. With common drain bias, internal "body" diode, typically used to protect VDs from fly back are forward biased for positive (P-CH) or negative (N-CH) voltage when power is applied. This forward bias initiates turn-on of the circuitry, thus enabling the positive or negative MosFET to conduct in the proper polarity. NPN and PNP transistors are configured to bias "off" the non-conducting MosFET. Resistor bias values are selected to enable turn-on when voltage exceeds a predetermined threshold, that is, above the software "Vf" threshold of the pad discrimination circuitry.

In many embodiments, parts of the system are provided in devices including microprocessors. Various embodiments of systems and methods described herein may be implemented fully or partially in software and/or firmware. This software and/or firmware may take the form of instructions contained in or on a non-transitory computer-readable storage medium.

Those instructions then may be read and executed by one or more processors to enable performance of the operations described herein. The instructions may be in any suitable form such as, but not limited to, source code, compiled code, interpreted code, executable code, static code, dynamic code, and the like. Such a computer-readable medium may include any tangible non-transitory medium for storing information in a form readable by one or more computers such as, but not limited to, read only memory (ROM); random access memory (RAM); magnetic disk storage media; optical storage media; a flash memory, etc.

Embodiments of systems and methods described herein may be implemented in a variety of systems including, but not limited to small appliances, power-tools, garden-tools, smartphones, tablets, laptops, and combinations of computing devices and cloud computing resources. For instance, portions of the operations may occur in one device, and other operations may occur at a remote location. In some embodiments a portion of the systems and methods may be implemented on a charging pad or a module connected to a charging pad, while other portions of the systems or methods may be implemented on a device having charging contacts. Any single computing device or combination of computing devices may execute the methods described.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof. Note that, although particular embodiments are shown, features of each attachment may be interchanged between embodiments.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A charging system comprising:
    a power delivery module including a plurality of contacts and a bypass rectifier, the plurality of contacts oriented to form a constellation circuit;
    a power management module configured to deliver power to the bypass rectifier based on the orientation of the constellation circuit; and a constellation configured to determine the orientation of the constellation circuit.

2. The charging system of claim 1, wherein the bypass rectifier is configured to bypass the constellation circuit.

3. The charging system of claim 1, wherein the constellation circuit is configured to receive power when the plurality of contacts are disposed on a power delivery pad.

4. The charging system of claim 1, wherein the constellation circuit is configured to charge a battery of an electronic device when the contacts are disposed on a power delivery pad.

5. The charging system of claim 4, wherein the electronic device is one of an appliance, a laptop, a power-tool battery, or a garden-tool battery.

6. The charging system of claim 1, wherein the power management module is configured to periodically turn on the constellation circuit to detect whether a valid constellation circuit or an invalid constellation circuit exists.

7. The charging system of claim 6, wherein the power management module is configured to turn on the bypass rectifier when the valid constellation circuit is detected and the constellation circuit is on.

8. The charging system of claim 7, further comprising a soft-start module providing a delay for ramping up of charge voltage for the bypass rectifier when the valid constellation circuit is first detected.

9. The charging system of claim 6, wherein the constellation is configured to detect whether the valid constellation circuit or the invalid constellation circuit exists.

10. The charging system of claim 1, wherein the bypass rectifier includes a metal-oxide-semiconductor field-effect transistor.

11. The charging system of claim 1, wherein the power delivery module includes a plurality of bypass rectifiers, each bypass rectifier in communication with a different one of the plurality of contacts.

12. A charging system comprising a power delivery module including a constellation and a bypass rectifier, the constellation configured to determine an orientation of a plurality of contacts forming a constellation circuit, the bypass rectifier configured to bypass the constellation circuit and deliver power to a device having the plurality of contacts based on the orientation of the contacts.

13. The charging system of claim 12, wherein the constellation is configured to detect a validity of the constellation circuit.

14. The charging system of claim 13, wherein the constellation is configured to periodically turn on to detect the validity of the constellation circuit.

15. The charging system of claim 13, wherein the constellation is configured to deliver power to the device when a valid constellation circuit exists.

16. The charging system of claim 15, wherein the bypass rectifier is configured to turn on when the valid constellation circuit exists.

17. The charging system of claim 12, wherein the power delivery module is a power delivery pad.

18. The charging system of claim 12, wherein the bypass rectifier includes a metal-oxide-semiconductor field-effect transistor.

19. The charging system of claim 12, wherein the power delivery module includes a plurality of bypass rectifiers, each bypass rectifier in communication with a different one of the plurality of contacts.

20. A charging system comprising:
a first device including a bypass rectifier, a plurality of contacts oriented to form a constellation circuit, and a module configured to deliver power to the bypass rectifier based on the orientation of the contacts; and
a second device including a constellation configured to determine the orientation of the contacts,
wherein the bypass rectifier is configured to bypass the constellation circuit and deliver power to the first device based on the determination of the orientation of the contacts.

* * * * *